US008989220B2

(12) United States Patent
Scrobohaci et al.

(10) Patent No.: US 8,989,220 B2
(45) Date of Patent: Mar. 24, 2015

(54) HIGH SPEED VARIABLE BANDWIDTH RING-BASED SYSTEM

(75) Inventors: Paul G. Scrobohaci, Menlo Park, CA (US); Ahmed Shahid, San Jose, CA (US); Bryan W. Chin, San Diego, CA (US); Leo Chen, Cupertino, CA (US)

(73) Assignee: Cavium, Inc., San Jose, CA (US)

( * ) Notice: Subject to any disclaimer, the term of this patent is extended or adjusted under 35 U.S.C. 154(b) by 368 days.

(21) Appl. No.: 13/481,122

(22) Filed: May 25, 2012

(65) Prior Publication Data

US 2013/0315236 A1 Nov. 28, 2013

(51) Int. Cl.
*H04L 12/26* (2006.01)
*H04L 12/801* (2013.01)
*H04L 12/873* (2013.01)
*H04W 28/06* (2009.01)

(52) U.S. Cl.
CPC ............. *H04L 47/39* (2013.01); *H04L 47/52* (2013.01); *H04W 28/065* (2013.01)
USPC ........ 370/474; 370/230; 370/230.1; 370/231; 370/258; 370/389; 370/395.53; 370/403; 370/404; 370/405; 370/406; 370/424; 370/452; 370/460; 370/473

(58) Field of Classification Search
CPC ...... H04L 47/39; H04L 47/52; H04W 28/065

USPC ............ 370/258, 389, 395.53, 403, 404–406, 370/424, 452, 460, 909, 230–231, 473–474
See application file for complete search history.

(56) References Cited

U.S. PATENT DOCUMENTS

| 5,633,870 | A | * | 5/1997 | Gaytan et al. | 370/235 |
| 5,963,557 | A | * | 10/1999 | Eng | 370/432 |
| 6,944,158 | B1 | * | 9/2005 | Wilson et al. | 370/392 |
| RE39,454 | E | * | 1/2007 | Cantoni et al. | 370/473 |

* cited by examiner

*Primary Examiner* — Mang Yeung
(74) *Attorney, Agent, or Firm* — Hamilton, Brook, Smith & Reynolds, P.C.

(57) ABSTRACT

In one embodiment, a system includes a station circuit. The station circuit includes a data layer and a transport layer. The station circuit is capable of a source mode and a destination mode. The data layer of the station circuit in source mode disassembles a source packet into one or more source parcels and sends the one or more source parcels to the transport layer. The station circuit in destination mode receives the one or more destination parcels over a ring at its transport layer, reassembles the one or more destination parcels into a destination packet, and delivers the destination packet from the transport layer to the data layer. The transport layer of the station circuit in source mode transmits the one or more source parcels over the ring. The transport layer of the station circuit in destination mode receives the one or more destination parcels over the ring.

36 Claims, 10 Drawing Sheets

HIGH SPEED VARIABLE BANDWIDTH RING-BASED SYSTEM

BACKGROUND

Processors include buses to connect various on- and off-chip devices. These devices can include processors, input/output interfaces, or memories. Using the bus to connect all of the devices together, the processor can utilize all of the devices together.

SUMMARY

In one embodiment, a system includes a station circuit. The station circuit includes a data layer and a transport layer. The station circuit is capable of a source mode and a destination mode. The data layer of the station circuit in source mode disassembles a source packet into one or more source parcels and sends the one or more source parcels to the transport layer. The station circuit in destination mode receives the one or more destination parcels over a ring at its transport layer, reassembles the one or more destination parcels into a destination packet, and delivers the destination packet from the transport layer to the data layer. The transport layer of the station circuit in source mode transmits the one or more source parcels over the ring. The transport layer of the station circuit in destination mode receives the one or more destination parcels over the ring.

In another embodiment, the station circuit includes at least one of a data consumption block and a data generation block. The data consumption block may include at least one of a data compression engine and an encryption engine. The data generation block may include at least a data access block.

In another embodiment, the source packet and destination packet may include at least one of a command, an address, a tag, a length, and a payload. The at least one source parcel and at least one destination parcel may include at least one of a source field, a destination field, a parcel payload, a thread identification number, and a virtual machine identification number. A particular source parcel may be part of the disassembled packet and the one or more source parcels may correspond with the one or more destination parcel, which may be reassembled into the destination packet. A source parcel and a destination parcel may or may not be identical.

In one embodiment, the data layer may be synchronized to a first clock. The transport layer may be synchronized to a second clock. The first and second clock are not required to have either the same clock rate or any phase relationship.

In another embodiment, the station circuit is one of a plurality of station circuits interconnected via the ring. Each station circuit may include a command credit count with respect to each of the other station circuits on the ring and a parcel credit count with respect to each of the other station circuits on the ring. A particular station circuit in source mode may send the source packet to a particular station circuit in destination mode if the command credit count of the particular station circuit in source mode with respect to the particular station circuit in destination mode is non-zero, and the parcel credit count of the particular station circuit in source mode with respect to the particular station circuit in destination mode is non-zero. The particular station circuit in source mode reduces its command credit count with respect to the particular station circuit in destination mode by one and reduces its parcel credit count with respect to the particular station in destination mode by the number of parcels sent upon sending the source packet to the particular station circuit in destination mode.

In another embodiment, the ring includes a credit interconnect ring and a data interconnect ring. The data interconnect ring delivers the one or more source parcels from the particular station circuit in source mode to the particular station circuit in destination mode as one or more destination parcels. The credit interconnect ring returns a command credit to the particular station circuit in source mode. The returned command credit is generated by the particular station circuit in destination mode upon the particular station circuit in destination mode consuming all of the one or more destination parcels such that the particular station circuit in source mode adds a command credit to the command credit count of the particular station circuit in source mode with respect to the particular station circuit in destination mode.

In another embodiment, the credit interconnect ring further returns a parcel credit to the particular station circuit in source mode. The returned parcel credit is generated by the particular station circuit in destination mode upon consuming a particular set of the one or more destination parcels such that the returned parcel credit represents one or more parcels being consumed. The particular station circuit in source mode adds a parcel credit to the parcel credit count of the particular station circuit in source mode with respect to the particular station circuit in destination mode. The returned parcel credits are sent for the particular set of the one or more destination parcels when a slot of the credit return ring becomes available.

In another embodiment, the command credit count of the particular station circuit in source mode with respect to the particular station circuit in destination mode is set by a credit-source station circuit issuing command credits over the credit interconnect ring. The parcel credit count of the particular station circuit in source mode with respect to the particular station circuit in destination mode is set by the credit-source station circuit issuing parcel credits over the credit interconnect ring. The credit-source station circuit is one of the plurality of station circuits. The credit-source station circuit may issue command credits and parcel credits at startup.

In another embodiment, an active station circuit can receive at least one of a command credit and a parcel credit from an inactive station circuit. The active station circuit and inactive station circuit may be one of the plurality of station circuits.

In another embodiment, parcel credits and command credits are sent over the credit interconnect ring using the same format. Command credits may be at least one of a read command credit and a write command credit. The station circuit in destination mode may include a receiving buffer reserved for a receiving destination parcels from the plurality of station circuits on the ring.

In another embodiment, the source and destination packet may be tagged with an identification number of a group. The group indicates a process identification number, a thread identification number, or a virtual machine identification number, such that a particular station circuit in destination mode can organize a set of destination packets tagged with different groups identification numbers to execute work within the destination packets upon receiving the destination packets. The particular station circuit may be issued credits based on an amount of processing power allocated to a virtual machine. The virtual machine may be indicated as a virtual machine assigned to work within the destination packets that the particular station circuit accepts. The particular station circuit may be configured to accept destination packets with work from a subset of identification numbers of groups.

In one embodiment, a method in a station circuit including a data layer and a transport layer, wherein the station circuit is capable of a source mode and a destination mode, may include disassembling a source packet into one or more source parcels in the data layer of the station circuit in source mode. The method may further include sending the one or more source parcels to the transport layer of the station circuit in source mode. The method may further include transmitting the one or more parcels over a ring from the transport layer of the station circuit. The method may also include receiving one or more destination parcels over the ring at the transport layer of the station circuit in destination mode. The method may further include reassembling the one or more destination parcels into a destination packet at the station circuit in destination mode. The method may additionally include delivering the destination packet from the transport layer to the data layer at the station circuit in destination mode.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

A variable bandwidth ring-based system bus ("bus") allows a device, such as a system-on-a-chip (SOC) block, to exchange data in arbitrarily-sized payloads. Examples of the device includes, but is not limited to, a compression engine and encryption/decryption engines. Multiple devices may be connected to the bus, and a device may choose to send write packets to or read packets from any device, including itself. Any two communicating devices may be referred to as a "doublet." Each doublet has a command exchange debit and a data exchange debit, using credit-based mechanisms.

Figure 1:
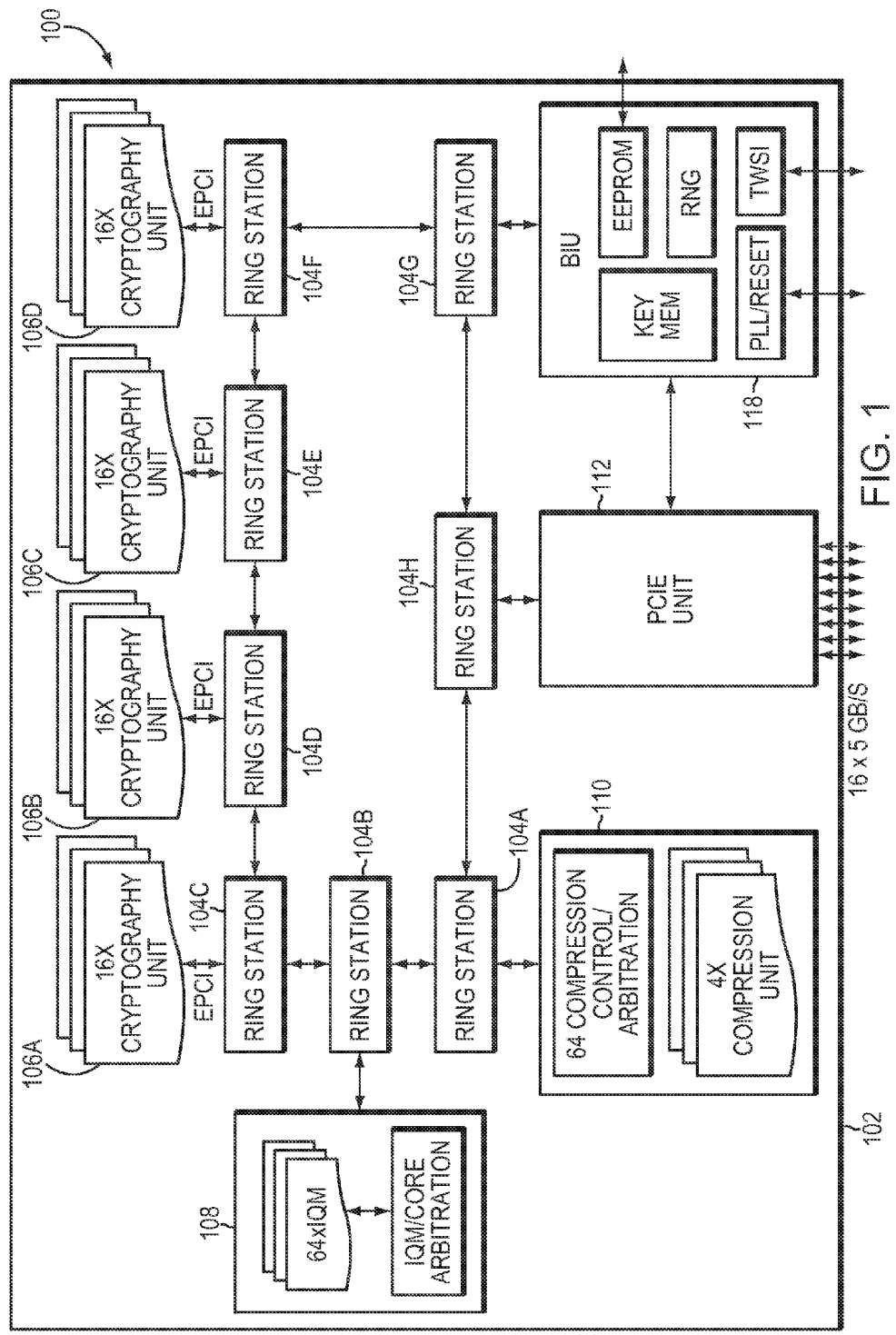
FIG. 1 is a block diagram illustrating a processor employing a ring bus of the present invention.

FIG. 1 is a block diagram 100 illustrating a processor 102 employing a ring bus of the present invention. The processor 102 includes a plurality of ring stations 104A-104H. Each of the ring stations 104A-104H is operatively coupled with a device of the processor 102. In addition, each ring station 104A-104H is operatively coupled with another ring station 104A-104H. In one embodiment, each ring station 104A-104H is coupled with two other ring stations 104A-104H to form the ring bus. For example, ring station 104A is operatively coupled with ring station 104B and ring station 104H. As another example, ring station 104B is coupled with ring station 104A and ring station 104C. In this manner, all of the ring stations 104A-104H can communicate with any of the ring stations 104A-104H through the ring bus.

In one embodiment of the processor 102, ring station 104A is coupled with 64 compression control/arbitration units 110. Ring station 104A transmits data to be compressed or decompressed to the compression control/arbitration units 110. After processing, the compression control/arbitration units 110 return the compressed or decompressed data.

Ring station 104B is coupled with an instruction queue management module 108. Ring station 104B sends instructions to the instruction queue management module 108, which assigns instructions to processor cores. After the instruction has executed, the instruction queue management module 108 returns the result of the instruction.

Ring stations 104C-104F are each coupled with cryptography unit 106A-106D respectively. Each cryptography unit 106A-106D is configured to encrypt or decrypt data received from ring stations 106A-106D.

Ring station 104G is coupled with a bus interface unit 118. Ring station 104G sends data to the bus interface unit 118 to communicate off the processor 102 via a Serial Electrically Erasable Programmable Read-Only Memory (EEPROM), a Two-Wire Serial Interface (TWSI), or a Phase-Locked Loop (PLL)/Reset interface. The ring station 104G can also request a key from a key memory, or request a random number be generated. The ring station 104G receives data from off the processor 102 via the Serial Electrically Erasable Programmable Read-Only Memory (EEPROM), the Two-Wire Serial Interface (TWSI), or the Phase-Locked Loop (PLL)/Reset interface. The ring station 104G also receives a key from the key memory or a random number from the random number generator.

Lastly, ring station 104H is coupled with a PCIe unit 112. The PCIe unit 112 is coupled with the bus interface unit 118. The ring station 104H sends data to the PCIe unit 112 to be transmitted off chip on a PCIe interface. Likewise, the ring station 104H receives data from the PCIe unit 112 which receives the data at the processor 102.

A person of ordinary skill in the art can appreciate that the devices coupled to the ring stations described above can be adjusted and that any amount of ring stations and devices can be added to or removed from the processor 102. Likewise, other components may be added to or removed from the processor 102. A person of ordinary skill in the art can understand that the ring stations 104A-104H are described to illustrate the ring bus.

Ring stations 104A-104H communicate with devices connected to them over a data media access layer (DMAL). Ring stations 104A-104H communicate with other ring stations over a transport layer (TL). In this manner, ring stations 104A-104H receive data from devices in the form of packets on the DMAL. The ring stations 104A-104H converts the packets to parcels for the transport layer.

Figure 2:
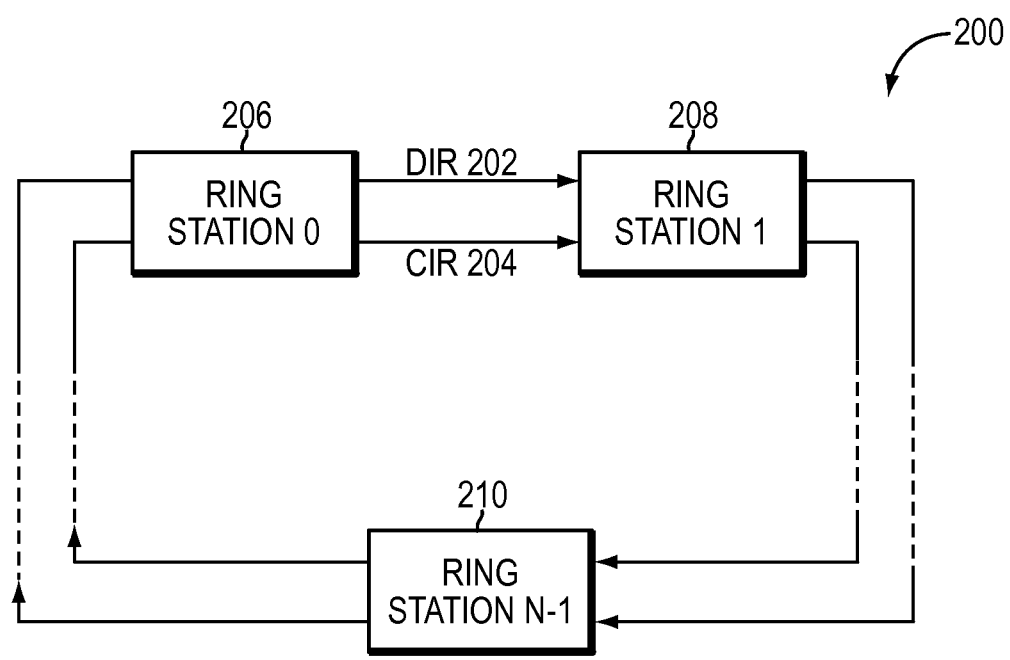
FIG. 2 is a block diagram illustrating an example embodiment of the ring bus at the transport layer level.

FIG. 2 is a block diagram 200 illustrating an example embodiment of the ring bus at the TL level. Ring station 0 206, ring station 1 208, and ring station N-1 210 are employed in the processor 102. The ring bus connects ring station 0 206, ring station 1 208, and ring station N-1 210 with a data interconnect ring (DIR) 202 and a credit interconnect ring 201 (CIR) 204. The DIR 202 carries data between ring stations 0 206, ring station 1 208, and station N-1 210. Likewise the CIR 204 carries credits between the ring station 0 206, ring station 1 208, and ring station N−1 210.

Figure 3:
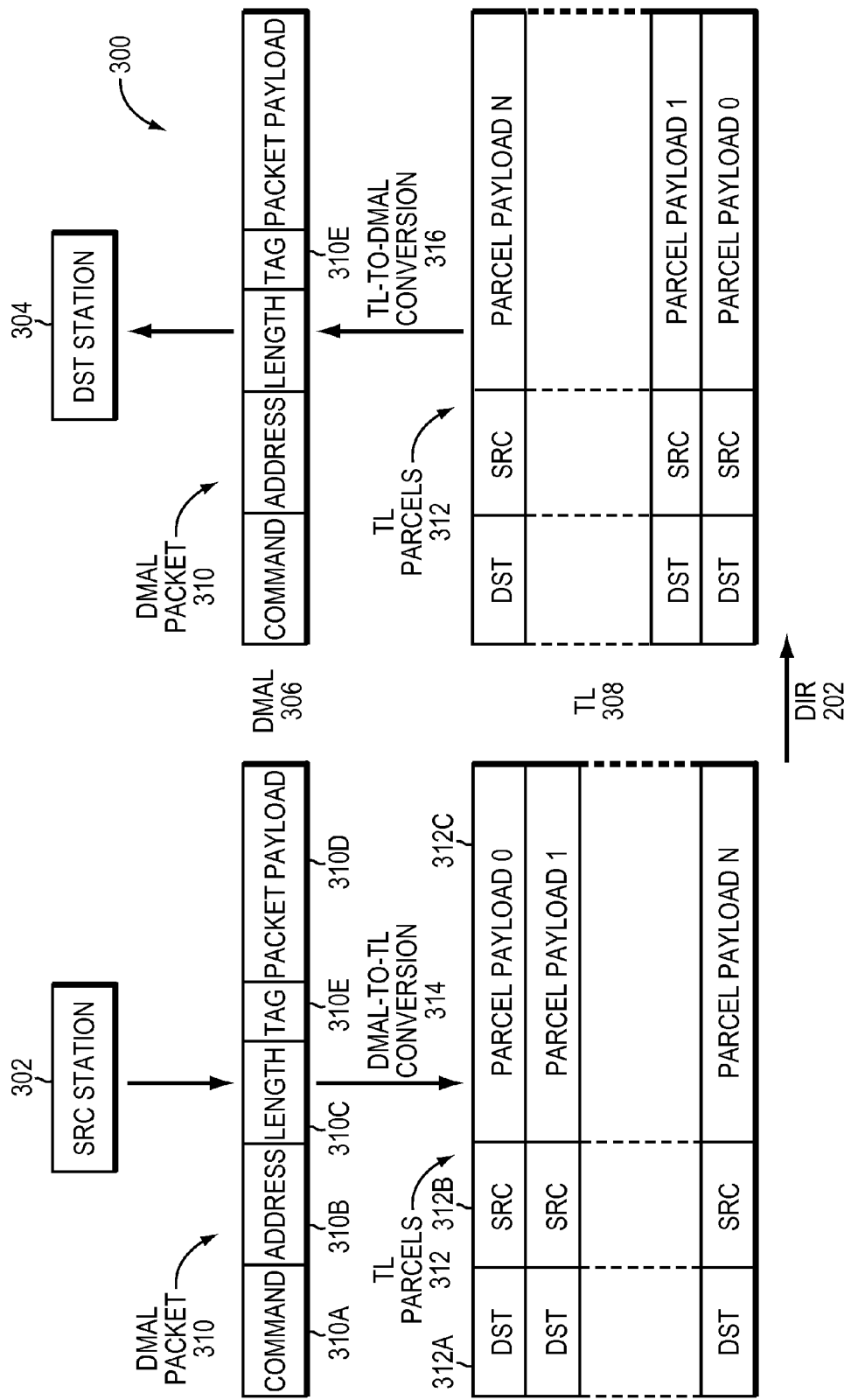
FIG. 3 is a block diagram illustrating an example embodiment of data media access layer packet to transport layer parcel conversion over the ring bus.

FIG. 3 is a block diagram 300 illustrating an example embodiment of DMAL packet 310 to TL parcel 312 conversion over the ring bus. A device connected to source station 302 generates a DMAL packet 310, at its DMAL 306, to be sent to destination station 304. Source station 302 and destination station 304 are a doublet (i.e., source station 302 is sending data to destination station 304). The DMAL packet 310 includes a command field 310A, an address field 310B, a length field 310C and a packet payload field 310D, and a tag field 310E. The command field 310A indicates whether the packet is a read packet or a write packet. The source station 302, at the TL 308, converts the DMAL packet 310 by performing a DMAL-to-TL conversion 314. The DMAL-to-TL-conversion 314 converts the DMAL packet 310, on the TL 308, into multiple TL parcels 312 by dividing the packet payload 310D of the DMAL packet 310 into multiple parcel payloads 312C of the multiple TL parcels 312. The multiple TL parcels 312 include a destination field 312A, a source field 312B, and the parcel payload field 312C. The combined parcel payload fields 312C of the multiple TL parcels 312 is the same as the packet payload field 310D of the DMAL packet 310.

The source station 302, at the TL 308, transfers the TL parcels 312 over the DIR 202 along the ring bus until the TL parcels 312 reach the destination station 304. The destination station 304, at the TL 308, performs a TL-to-DMAL conversion 316. The TL-to-DMAL conversion 316 converts the TL parcels 312 to the DMAL packet 310 by combining the parcel payloads 312C of all of the TL parcels 312 into the packet payload 310D of the DMAL packet 310. The destination station 304, at the DMAL 306, receives the DMAL packet 310. Then, the device coupled with the destination station 304 receives the DMAL packet 310.

The device coupled to the source station 302 resides in the DMAL 306. The DMAL 306 is oriented around transactions. The DMAL 306 views a transaction at the data packet level and pays for transactions with command credits. The source station 302 at the DMAL 306 exchanges command credits with the destination station 304 to send a data packet. The DMAL 306 does not exchange parcel credits.

The DMAL 306 at each station is an interface between a device on the processor and the TL 308. DMAL packets 310 have a size (sometimes referred to as "beats"), which is determined at implementation size, which allows the device on the processor to communicate with the TL 308. A person of ordinary skill in the art can consider the size of the DMAL packets 310 to be a data bus width of the station.

DMAL packets 310 transferred between a doublet, such as between source station 302 and a destination station 304, can be "interleaved." At the DMAL 306, a doublet may have a particular number of transactions pending. For each doublet, a DMAL packet 310 pertaining to any active transaction may be transmitted at any time. In other words, DMAL packets 310 regarding different transactions within a doublet can be interleaved. Data in the DMAL packets 310 are bound to their particular transactions using the tag field 310E. Tag-based data interleaving maximizes bandwidth utilization of the DMAL 306 and the TL 308, where each particular transaction thread may be bursty, by spreading available bandwidth between transaction threads and ring stations. The bandwidth of a doublet is defined by the maximum number of simultaneous transactions that doublet can perform. This is initially set by a parameter that issues command credits to each doublet, optionally at system start-up. Optionally, tag field 310E reutilization can ensure a destination DMAL 306 is ready to receive a write data packet because, for example, a previous command to the destination DMAL 306 has completed. For example, should a write packet be accepted by the destination DMAL 306, a second write packet with the value in its tag field 310E should also be accepted by the destination DMAL 306 because it ensures that the destination DMAL 306 is not receiving a command.

The DMAL 306 is agnostic of the characteristic parameters of the TL 308, and the TL 308 is agnostic of the characteristic parameters of the DMAL 306. For example, the TL 308 is unaware of command credits, packet lengths and memory addresses of packets in the DMAL 306 and the DMAL 306 is unaware of destination or source station identifiers and credits of parcels in the TL 308. Therefore, device details are isolated from the physical implementation of the ring bus. In addition, the physical segregation of the TL 308 and the DMAL 306 allows for a general purpose implementation of the DIR 202 and CIR 204, independent of the types of devices (e.g., bus widths, clock frequencies) attached to ring stations via the DMAL 306 or the types of their requests (e.g., packet sizes, reads or writes, endianness). The ring stations translate two-way between the DMAL 306 and TL 308. Data endianness is specified for each device on the DMAL 306 and converted to a device-independent format on the TL 308 (and therefore the DIR 202).

The TL 308 includes the CIR 204 and the DIR 202. The CIR 204 is separate from the DIR 202, and allows ring stations to exchange credits. Parcel credits guarantee availability of data storage in the TL 308. Command credits guarantee the availability of command (read/write) buffers in the DMAL. Parcel and command credit distribution shapes traffic for each doublet in the TL 308 and DMAL 306. A destination ring station's TL 308 returns a parcel credit to a source ring station when a parcel from that destination ring station's TL 308 is consumed by its DMAL 306. A destination ring station's DMAL 306 returns a command credit to a source ring station's DMAL 306 after the destination ring station processes the last data parcel in a request.

The CIR 204 payloads are formed of a header containing the addresses of the source and destination stations and a credit payload. The credit payload contains a field for each type of credit (e.g., parcel, write command, read command). A destination ring station releases a credit payload to the CIR 204 if the credit payload contains at least one non-zero field and the CIR 204 has an empty slot to transport the credit parcel. When no empty slot is available on the CIR 204, the ring station accumulates credit return counts. Accumulated credit counts can be aggregated into one credit parcel. The CIR 204 is also used after reset or at start-up to initialize a system's credit count matrix (the initial number of parcel, read, and write credits for every doublet).

Figure 4:
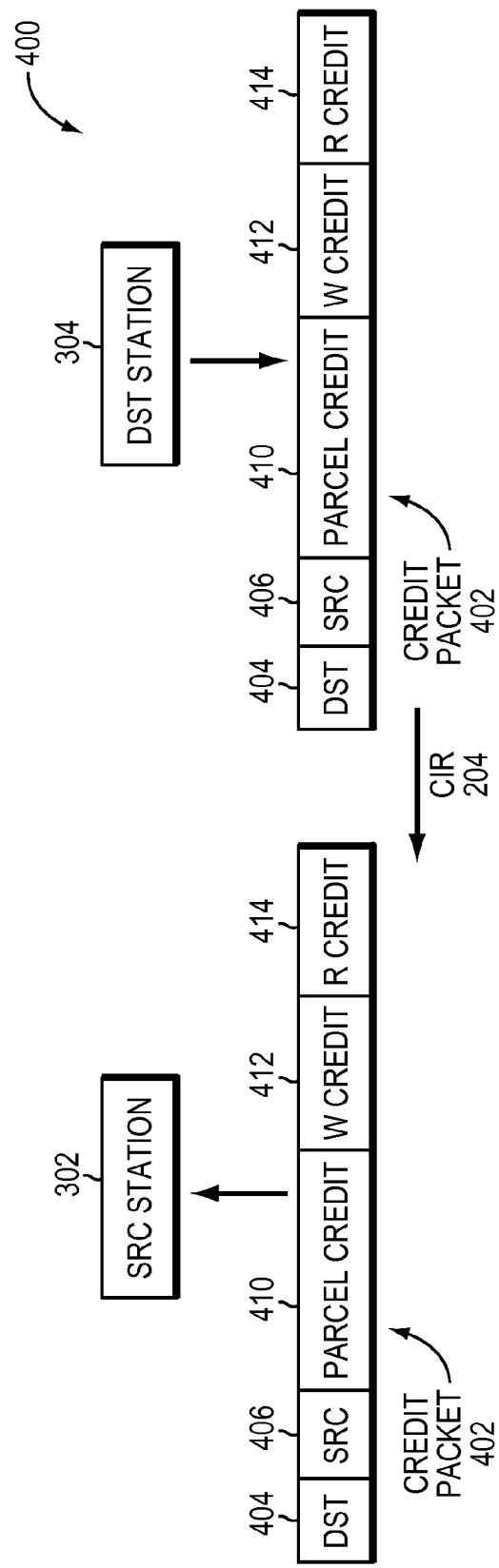
FIG. 4 is a block diagram illustrating the credit interconnect ring.

FIG. 4 is a block diagram 400 illustrating the CIR 204. The CIR 204 exists in the TL. The source station 302 and destination station 304 are a doublet. The destination station 304 generates a credit packet 402. The credit packet 402 includes a destination field 404, a source field 406, a parcel credit field 410, a write credit field 412 and a read credit 414 field. The parcel credit field 410 stores parcel credits that indicate that the DMAL of the destination station 304 consumed a parcel from the TL. The write credit field 412 and read credit field store command credits that indicate the device coupled to the destination station 304 consumed a packet from the DMAL. One instance of the parcel credit field 410 can store one individual credit, multiple credits of the same type, or multiple credits of different types. For example, the parcel credit field 410 can indicate that the credit parcel is delivering one read credit, but it can also indicate that the credit parcel is delivering three read credits, two write credits, and seven parcel credits.

The destination station transmits the credit packet 402 over the CIR 204 to the source station 302. The credit packet 402 indicates that the destination ring station 304 has freed up room on its TL 308 if the credit packet 402 includes a parcel credit, or the destination ring station 304 freed up room on its DMAL 306 if the credit packet includes a command credit (e.g., a read or write credit). The source station 302 increments its credit count by the amount of credits indicated in the credit parcel corresponding to the doublet of the source station 302 and the destination station 304.

The source station 302 may send a parcel to the destination station 304 only if it has a non-zero credit count for the destination station 304. Each ring station has a separate buffer to store parcels for each destination station. The separate buffers prevent blocking between doublets due to zero credit counts or unresponsiveness of the destination station 304. Further, it maximizes bandwidth utilization by providing a straightforward backpressure mechanism from the destination station 304 to the source station 302. When the source station 302 sends the parcels 312 to the destination station 304, it decrements its credit count to that station by an amount corresponding to the number of the parcels 312 sent, and places the TL parcels 312 on the DIR 202. When the TL parcels 312 reach destination station 304, the destination station 304 stores the TL parcels 312 in a queue. When the destination station 304 consumes the TL parcels 312 from the queue, therefore incrementing its parcel storage capability on the DIR 202, it returns credits, the amount of which correspond to the number of TL parcels 312 consumed through the CIR 204 to the source station 302, which increments its credit count with respect to the doublet corresponding to the destination station 304.

In one embodiment of the ring bus, each doublet is initialized to an initial number of credits stored in the ring stations and then modified by the parcel and credit exchange mechanisms described above. Upon start-up, a ring station can issue credits along the CIR to assign the initial number of credits to each doublet. In reference to FIG. 1, a first example doublet can be ring station 104C (as a source) and ring station 104B (as a destination), and a second example doublet can be ring station 104A (as a source) and ring station 104H (as a destination). Ring station 104G can issue credits along the CIR to assign the initial number of credits to each doublet. For example, at start-up, ring station 104G can issue 10 read credits, 10 write credits, and 50 parcel credits to the first doublet. The ring station 104G can issue 20 read credits, 20 write credits, and 100 parcel credits to the second doublet. By doing so, the second doublet has double the bandwidth of the first doublet. A person of ordinary skill in the art can recognize that doublets can be issued any combination of read credits, write credits, and parcel credits, and the numbers described above are for illustration.

In another embodiment, ring station 104G can receive credit counts to issue to each doublet from a device off the processor 102 via bus interface unit 118. For example, the device off the processor 102 can instruct ring station 104G to give more credits, and therefore bandwidth, to a particular doublet.

Figure 5:
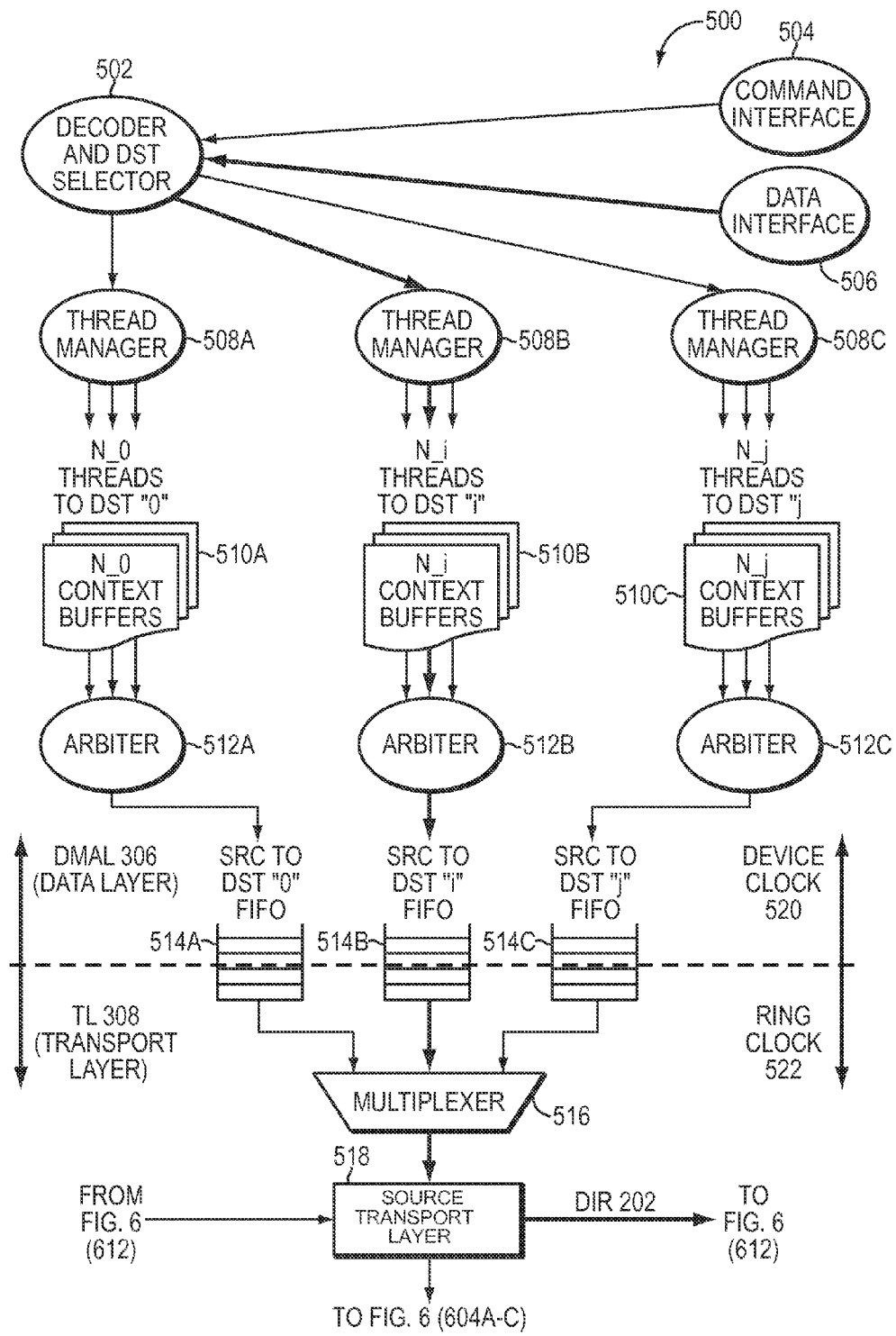
FIG. 5 is a block diagram illustrating an example embodiment of a source ring station converting packets from the data media access layer to the transport layer.

FIG. 5 is a block diagram 500 illustrating an example embodiment of a source ring station converting packets from the DMAL 306 to the TL 308. A command interface 504 and a data interface 506 are operatively coupled to transmit to a decoder and destination selector unit 502. In one embodiment, the command interface 504 and data interface 506 interface with the device coupled with the source stations. The decoder and destination selector unit 502 is operatively coupled to transmit commands and data to thread managers 508A-508C. Each thread manager 508A-508C is configured to generate packets to a particular destination ring station, e.g. thread manager 508A is configured to generate packets to a destination station "0," thread manager 508B is configured to generate packets to a destination station "i," and thread manager 508C is configured to generate packets to a destination station "j." A person of ordinary skill in the art can recognize that the thread managers 508A-508C can be any number of thread managers. In one embodiment, the thread managers 508A-508C are of the same quantity as the number of ring stations on the ring. Next, the thread managers 508A-508C transmit threads to context buffers 510A-510C, respectively. Then, each context buffer 510A-510C transmits context to arbiters 512A to 512C. The arbiters 512A-512C select a particular packet to send to source-to-destination FIFO queues 514A-514C, respectively. A person of ordinary skill in the art can also recognize that the context buffers 510A-510C, arbiters 512A-512C, and source-to-destination FIFO queues 514A-514C can be of any quantity. In one embodiment, the context buffers 510A-510C, arbiters 512A-512C, and source-to-destination FIFO queues 514A-514C are of the same quantity of the thread managers 508A-508C or the number of ring stations on the ring.

The source-to-destination FIFO queues 514A-514C are connected to a multiplexer 516 within the transport layer 308. Each of the source-to-destination FIFO queues 514A-514C store packet data until the multiplexer 516 selects the source-to-destination FIFO queue 514A-514C to pop one of the packets from the queue into the source TL 518. The source to destination FIFO queues 514A-514C pop the packet by converting it to multiple TL parcels, which are sent to a source TL 518. The multiple parcels received at the source TL 518 are then transmitted over the data interconnect ring 202. The parcels are forwarded on the DIR 202, described further in FIG. 6 at reference number 612. Further, the source TL 518 receives parcels from the DIR 202, described further in FIG. 6 at reference number 612. Further the source TL 518 transmits to the CIR (not shown), described further in FIG. 6 reference number 604A-604C.

The DMAL 306 runs on a device clock 520. The TL 308 runs on a ring clock 522. The device clock 520 and the ring clock 522 can be asynchronous with respect to each other. In one embodiment, the device clock 520 and ring clock 522 are asynchronous by having unrelated phases and frequencies. One-clock ring stations and two-clock ring stations using the same bus clock frequency may be interconnected. Two clock ring stations traverse a clock boundary in both directions at the interface between TL 308 and DMAL 306 using the source-to-destination FIFO queues 514A-514C, which act as synchronizing FIFOs.

Figure 6:
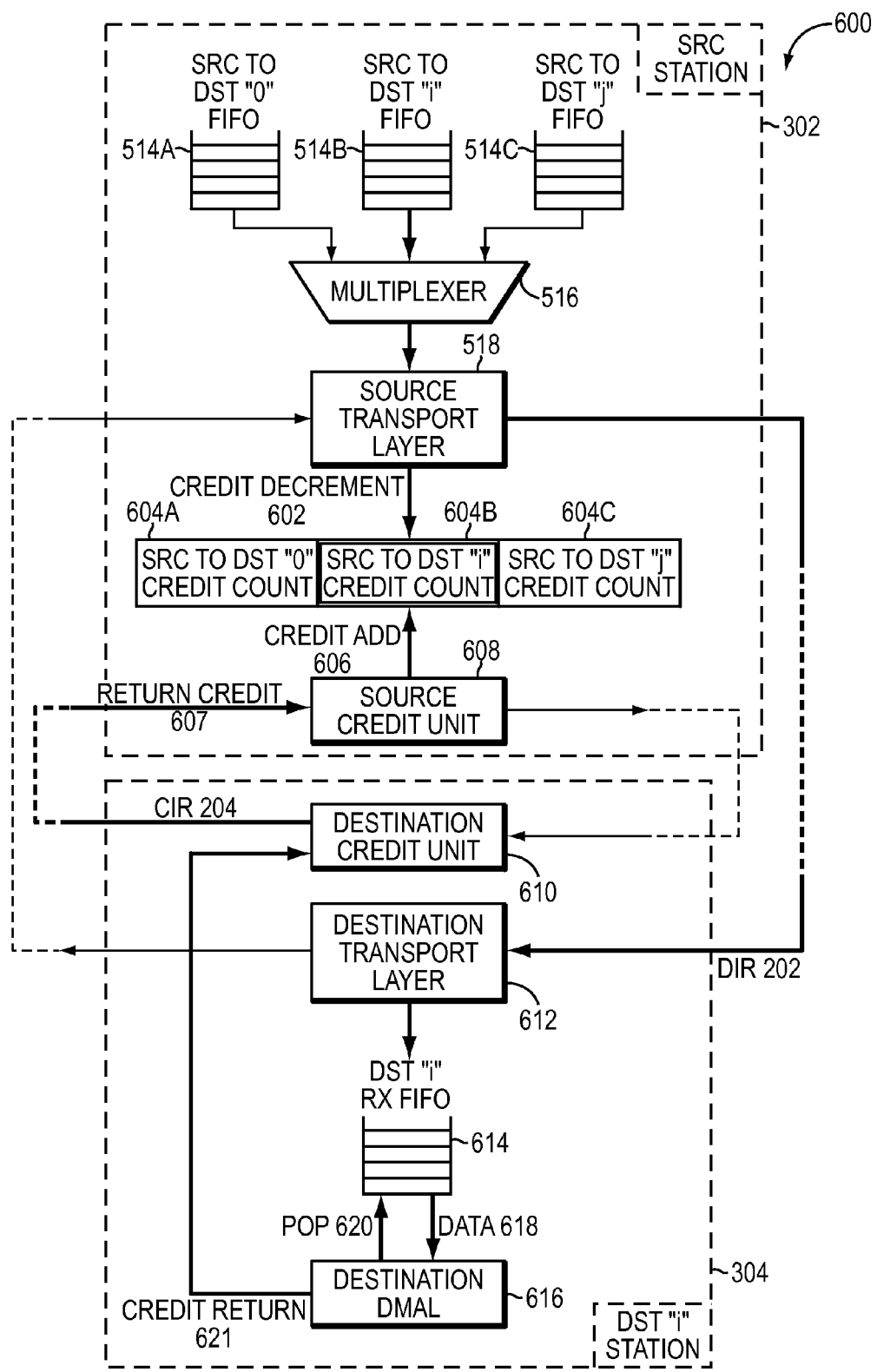
FIG. 6 is a block diagram illustrating an example embodiment of the credit interconnect ring and the data interconnect ring interacting with a source station and the destination station.

FIG. 6 is a block diagram 600 illustrating an example embodiment of the CIR 204 and the DIR 202 interacting with a source station 302 and the destination station 304. As described in FIG. 5, source-to-destination FIFO queues 514A-514C are coupled with a multiplexer 516, which selects packets from the source-to-destination FIFO queues 514A-514C to send to the source TL 518 as multiple parcels. Upon receiving the parcels from the multiplexer 516, the source TL 518 decreases a source-to-destination credit count 604A-604C corresponding with the source-to-destination FIFO queue 514A-514C where the packet originated. For example, if the packet is from source-to-destination FIFO 514B, the source TL 518 decreases the source-to-destination credit count 604B. The credit count 604B is reduced by one command credit, and by as many parcel credits as there are parcels popped from the source-to-destination FIFO queue 514A-514C. The source-to-destination "0" FIFO 514A corresponds with the source-to-destination "0" credit count 604A. Likewise the source-to-destination "I" FIFO queue 514B corresponds with source to destination "I" credit count 604B. In addition the source-to-destination "J" FIFO queue 514C corresponds with the source-to-destination "J" credit count 604C. A person of ordinary skill in the art can recognize that each destination that the source-to-destination FIFO queue 514A-514C and the source-to-destination credit count 604A to 604C correspond with a specific destination on the ring bus. In this particular example, the doublet between the source station 302 and destination station "i" 304 is illustrated.

The source TL 518, after decrementing the credit count appropriately, transfers the parcels to the destination ring station 304. The destination station 304 receives the parcels at a destination transport layer 612. Upon receipt of the parcels, destination transport layer 612 pushes the parcels into a destination receipt FIFO queue 614. When the destination DMAL 616 is ready to receive the parcels from the TL, it signals the destination receipt FIFO queue 614 with a pop signal 620. Upon receiving the pop signal 620, the destination receipt FIFO 614 transmits data 618, collected from the multiple parcels in the form of a packet, to the destination DMAL 616. Data 618 can include at least one parcel. Upon receiving data 618, the destination DMAL 616 transmits a credit return 621 to the destination credit unit 610. The destination credit unit 610 transmits a return credit 607 over the CIR 204 to the source credit unit 608. The source credit unit 608 then sends a credit add 606 to the appropriate source to destination credit count 604A-604C. In this manner, upon receiving the data at the destination DMAL 616, the source to destination credit count 604B is restored.

Figure 7A:
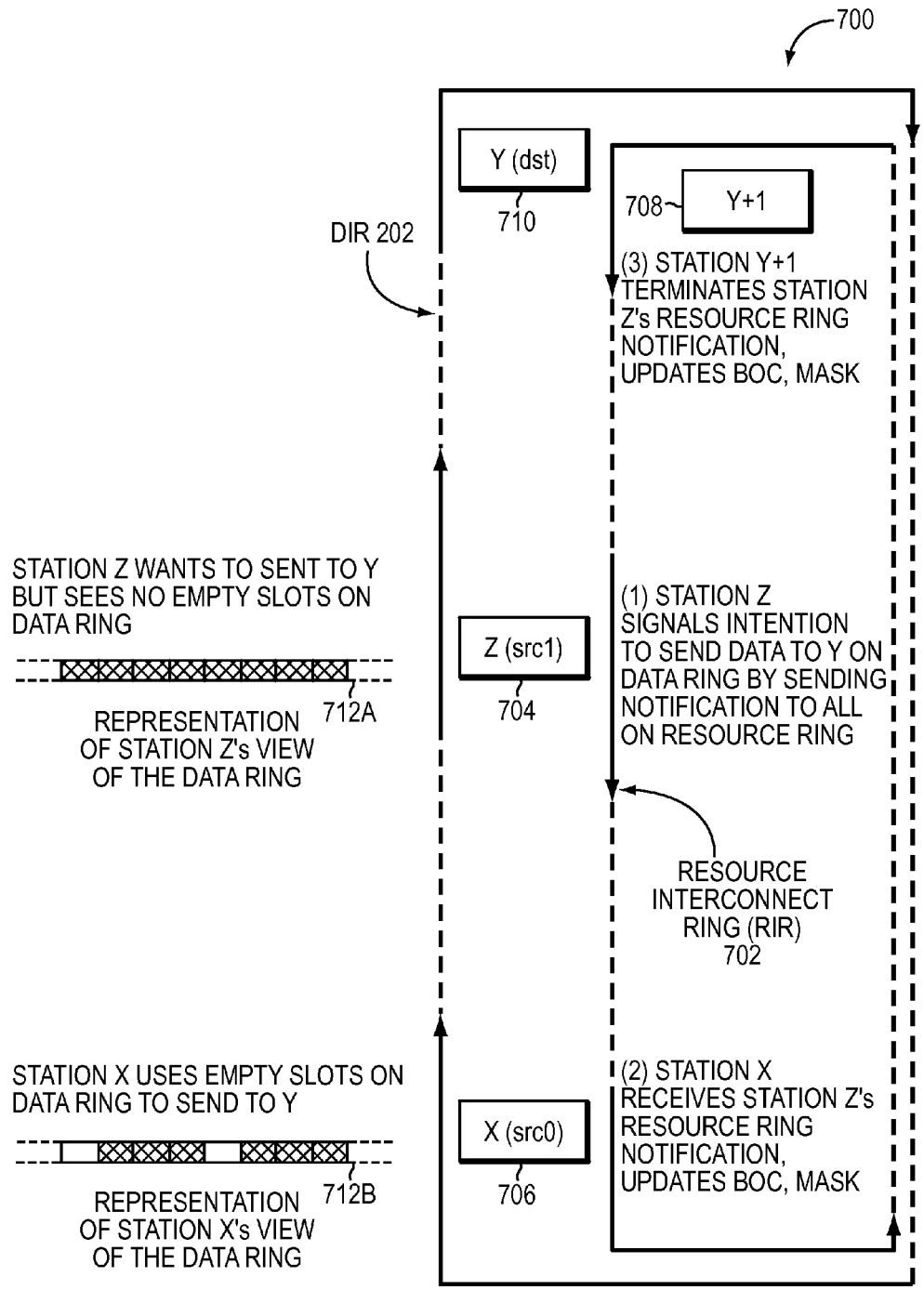
FIGS. 7A-7D are block diagrams illustrating an example embodiment of the ring bus configured to employ credit-based dynamic bandwidth shaping along a data interconnect ring and a resource interconnect ring.
Figure 7B:
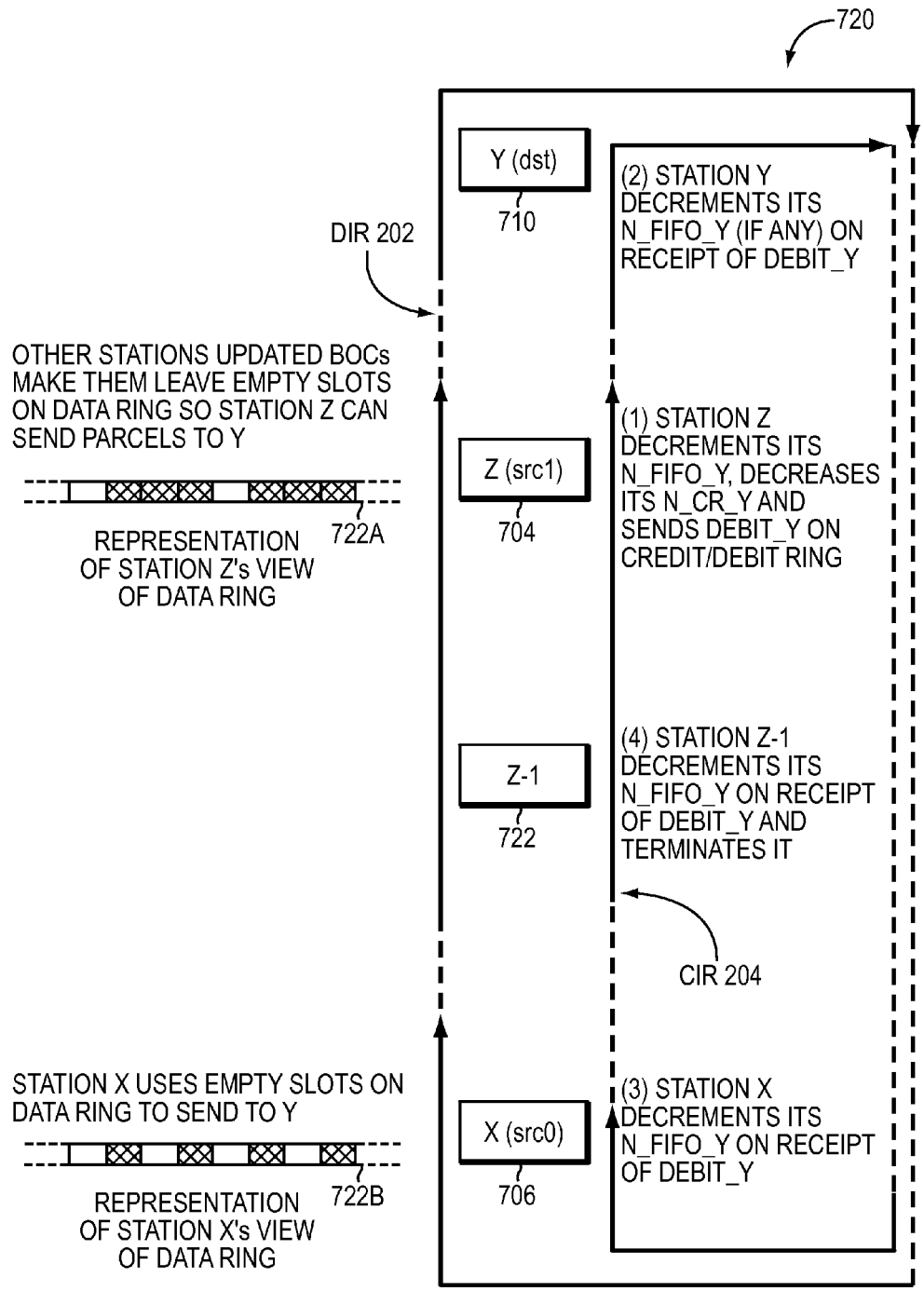
Figure 7C:
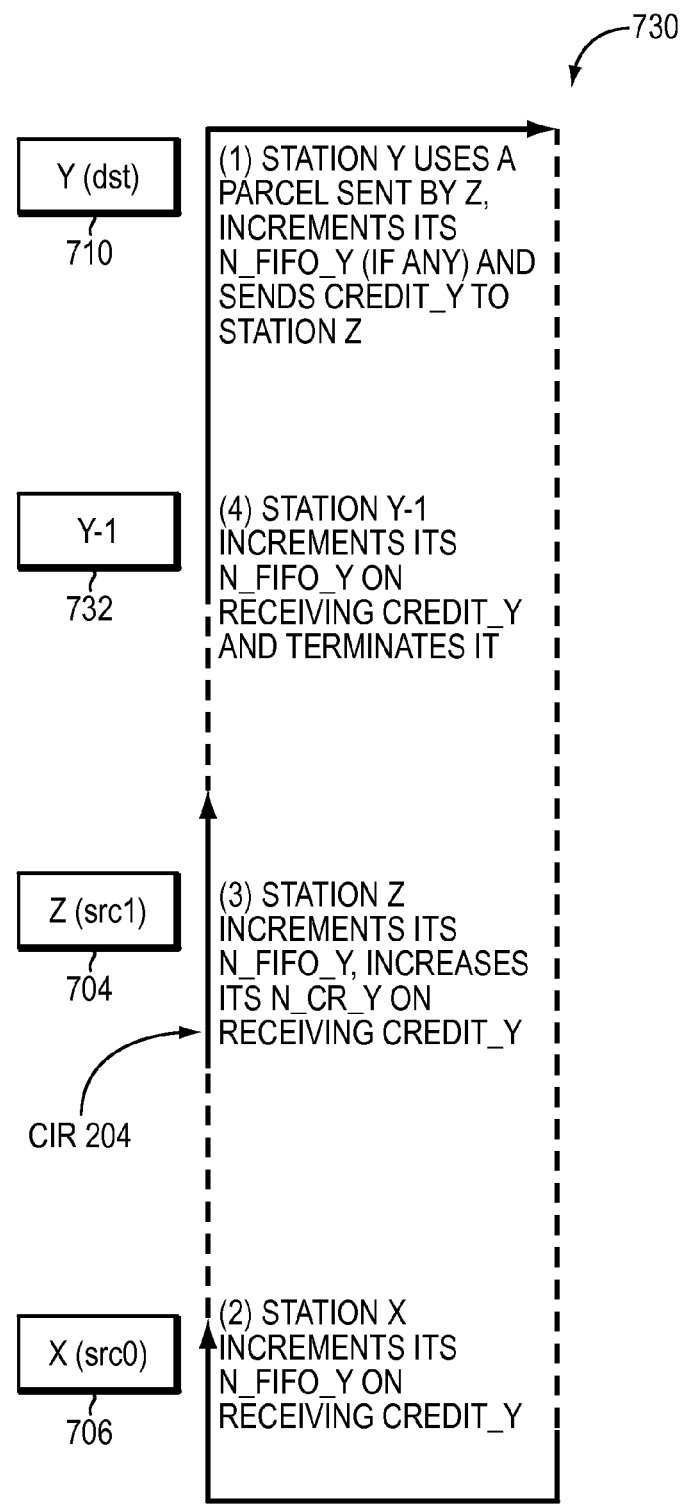
Figure 7D:
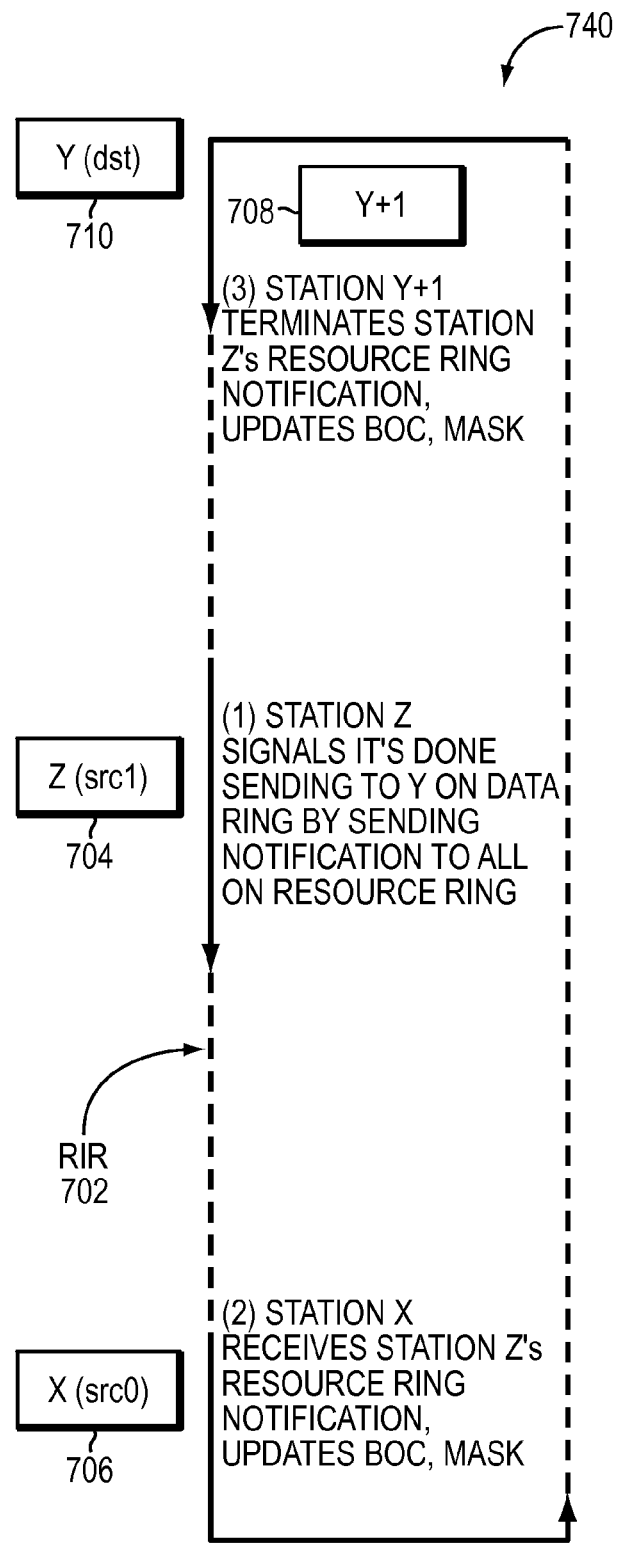

FIGS. 7A-7D are block diagrams illustrating an example embodiment of the ring bus configured to employ credit-based dynamic bandwidth shaping along a DIR 202 and a resource interconnect ring (RIR) 702. FIGS. 7A-7D each illustrate a stage of the example embodiment. FIG. 7A illustrates a first stage of the embodiment, FIG. 7B illustrates a second stage of the embodiment, FIG. 7C illustrates a third stage of the embodiment, and FIG. 7D illustrates a fourth stage of the embodiment.

FIG. 7A is a block diagram 700 illustrating the first stage of the example embodiment of the ring bus configured to employ credit-based dynamic bandwidth shaping along a DIR 202 and a resource interconnect ring (RIR) 702 by requesting credits to send parcels. Dynamic bandwidth shaping is a manner of sharing resources among active doublets to increase bandwidth of the active doublets. In one embodiment, a default ring bus credit mechanism is static. In other words, in this embodiment, each ring station has a maximum bandwidth based on the number of credits granted, regardless of whether the ring station uses the credits. The engines commonly used (e.g., compression, cryptography, etc.) are bursty. In other words, most of the time the engines create little-to-no traffic while computing, but for short time periods they read and/or write (potentially large) chunks of data in contiguous packets. Such bursty engines can benefit from access to high bandwidth over these short time periods.

When an inactive doublet becomes active, it requests a portion of bandwidth from the other active doublets. An active doublet releases its bandwidth to the other active doublet(s) upon becoming inactive. The bandwidth requests and releases are made over the RIR 702.

An inactive doublet may share credits with any active doublet (i.e., a requesting doublet) via the CIR 204 to increase the active doublet's transient bandwidth. When an inactive doublet becomes active, it requests its shared credits be returned to it by the doublets with which it shared credits. When an active doublet ceases activity and becomes inactive, it automatically releases all shared credits it received from all other inactive doublets.

A person of ordinary skill in the art can also appreciate that basing dynamic credit distribution on packet activity extends management of credits from the TL 308, where credit-related decisions are made at the parcel level, to the DMAL 306, which is packet-aware.

Each ring station has a first counter indicating how many entries remain in the destination station's receive FIFO queue. The first counter is initialized to the size of the destination FIFO queue. Each ring station has a second counter indicating the number of credits it has to send to the destination station, which is initialized to the size of the destination FIFO. Each ring station has a first and second counter for every other ring station on the ring bus. A bit mask (not shown) indicates which stations are actively sending to the destination station. Each ring station may have a back-off counter (BOC) which indicates how many empty parcel slots each station should allow to pass before allocating its own parcel on the ring since the previous parcel it allocated on the ring. The BOC is initialized to 0 for all stations.

In an example embodiment, should a station Z 704 start sending parcels to station Y 710, but see no empty slots on the DIR 202 (as shown in 712A), station Z 704 uses the RIR 702 to "get on" the DIR 202 by setting other stations' bit masks and BOCs (not shown). Station Z 704 signals its intention to send data to station Y 710 by sending notification to all stations along the RIR 702. Station X 706, as an example, receives the notification and updates its bit mask (not shown) with respect to station Y and increments its BOC. Station Y+1 708, the station that receives the notification directly before Station Y 710, terminates the notification while updating its bit mask (not shown) and BOC.

A representation 712A of station Z's 704 view of the DIR 202 with respect to sending parcels to station Y 710 shows no empty slots, where each slot is shown as full. On the other hand, representation 712B of station X's 706 view of the DIR 202 shows several empty slots to send a parcel. All the empty slots visible to station X 706 (see representation 712B) are used by station X 706 causing station Z 704 to have no empty slots available to it.

FIG. 7B is a block diagram 720 illustrating the second stage of the example of operation described above where, upon receiving station Z's 704 request to send data to station Y 710, station X 706 knows (from its BOC's value) to back off from using all empty slots, thereby leaving empty slots for station Z 704. This is illustrated by representations 722A and 722B, which are the same representations as 712A and 712B, respectively, but represented at a different point in time. Should station Z 704 send parcels to station Y 710 while no other station is transmitting, station Z 704 determines the first counter and second counter are both non-zero for each parcel it sends to station Y 710. Station Z 704 decrements its first counter (e.g., N_Fifo_Y in FIG. 7B) with respect to station Y 710, decrements its second counter (e.g., N_Cr_Y in FIG. 7B) with respect to station Y 710, puts each parcel on the DIR 202 and puts a debit request on the RIR (not shown). The debit request on the RIR (not shown) decrements the first counter (e.g., N_Fifo_Y in FIG. 7B) in each station it encounters and sets station Z's 704 bit in each station's bit mask (not shown) and updates its BOC. Each station's bit mask (not shown) and BOC are set to leave empty slots on the DIR 202 such that station Z 704 can send to station Y 710.

The empty slots represent empty entries on DIR 202, shown in representation 722A, from the perspective of station Z 704 and shown in representation 722B, from the perspective of station X 706.

FIG. 7C is a block diagram 730 illustrating the third stage of the example embodiment described above. In this step, should station Y 710 pop a parcel received from station Z 704, off its receive FIFO to be consumed by the DMAL 306, station Y 710 returns a credit to station Z 704. The credit packet increments all of the first counters (e.g., N_Fifo_Y as in FIG. 7C) on the way to station Z 704. Station Z 704 increments its first counter (e.g., N_Fifo_Y as in FIG. 7C) and second counter (e.g., N_Cr_Y as in FIG. 7C) and station Z 704 forwards the credit back to station Y 710 to accomplish the above on the other side of the ring until Y terminates it. All stations maintain an exact or a conservative count of the number of entries left in the destination receive FIFO. The entry count is decremented early (i.e., as soon as the entry is created and before the parcel enters the FIFO) and incremented late (i.e., when the return credit is received back on the CIR after the corresponding FIFO entry is popped) to keep an exact or conservative count.

Ring stations do not have to send a credit request and wait for another ring station to respond, which avoids unnecessary delays. Stations are aware of available resources because bandwidth shaping is operated at the packet level in the DMAL, removing unnecessary parcel-level traffic for the maintenance of "activity" information in each station by keeping that information at packet level.

FIG. 7D is a block diagram 740 illustrating the fourth stage of the example embodiment described above. In this step, station Z 704 indicates its intention to get off the RIR 702. Station Z 704 signals, over the RIR 702, it is done sending parcels to station Y 710. Station X 706 receives station Z's notification, and updates its bit mask (not shown) and its BOC. All stations until Station Y+1 708 do the same, where station Y+1 708 additionally terminates Station Z's 704 notification.

If station Z 704 wants to send to station Y 710, it performs the above steps, however, knowing that station X 706 already communicates with station Y 710 (from the bit mask), it has to pay (e.g., subtract) two credits to send a parcel to station Y 710, which returns two when it consumes the parcel. When its debit request goes through station X 706, station X 706 updates its mask of active stations and BOC and also starts requiring/subtracting two credits to send to station Y 710.

This automatically splits the bandwidth between station X 706 and station Z 704 within a few clock cycles. If three stations are active, each parcel costs three credits. A person of ordinary skill in the art can recognize that the cost of borrowing credits is proportional to the number of active stations. The first counter decrements or increments. A ring station sends a termination request on the CIR to indicate it is momentarily done using the ring bus. The termination request resets the requesting station's active bit in all station's resource mask, causing the stations to require one less credit to send. Further, a 1-bit ring (i.e., RIR 702) used only for "getting on" and "off" the ring bus sets and resets activity bit masks and BOCs to avoid saturation of the ring and blocking of a particular station from "getting on."

In yet another embodiment, a centralized bandwidth distribution slotting controller is configured to dynamically assign bandwidth to doublets based on observed bandwidth utilization. In other words, instead of requesting doublets and sharing doublets requesting credits, the centralized bandwidth distribution slotting controller is configured to observe the bandwidth needs of all the doublets. Based on this observation, the centralized bandwidth distribution slotting controller is configured to dynamically assign bandwidth to each doublet.

In one embodiment, the ring bus supports virtualization and the TL and DMAL are Virtual Machine (VM) aware. VM support allows per-VM doublet bandwidth control, command credit allocation, resource allocation, traffic segregation and programmable active VM count. Traffic on the ring can be classified as belonging to a number of VMs. Each VM enables hardware resources it accesses by setting one of multiple mask registers. The mask registers dynamically map a hardware resource to a set of VMs.

Each DMAL transaction on the ring can be associated with a Virtual Machine/Function Tag identifier (VFID tag). The VFID tag is included in all phases of a DMAL transaction and restricts the visibility of the transaction to hardware resources belonging to that particular VM. The VFID tag isolates VMs by protecting a particular VM from accessing another VM's resources. Source-to-destination credits associated with a VFID tag are not generic hardware resources, but are bound to a specific VM. VM specific credits are consumed when the VFID tag of the transaction matches the VFID tag stored with the credit value.

Ring credits can be divided among all the VMs to give more credits to a particular VM, therefore allotting the particular VM more bandwidth on the ring bus. Similarly, assigning fewer credits to a particular VM allots a lower share of the bandwidth to the particular VM. VM Quality of Service ("QoS") controls the ratio of command/parcel credits among the different VMs that actively send transactions on the ring bus.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
a station circuit including a data layer and a transport layer, the station circuit capable of a source mode and a destination mode, the data layer of the station circuit in source mode disassembling a source packet into one or more source parcels and sending the one or more source parcels to the transport layer, the station circuit in destination mode receiving one or more destination parcels over a ring at its transport layer, reassembling the one or more destination parcels into a destination packet, and delivering the destination packet from the transport layer to the data layer;
wherein the transport layer of the station circuit in source mode transmits the one or more source parcels over the ring and the transport layer of the station circuit in destination mode receives the one or more destination parcels over the ring;
wherein each station circuit includes a command credit count with respect to each of the other station circuits on the ring and a parcel credit count with respect to each of the other station circuits on the ring;
wherein a particular station circuit in source mode sends the source packet to a particular station circuit in destination mode if the command credit count of the particular station circuit in source mode with respect to the particular station circuit in destination mode is non-zero, and the parcel credit count of the particular station circuit in source mode with respect to the particular station circuit in destination mode is non-zero, and the particular station circuit in source mode reduces its command credit count with respect to the particular station circuit in destination mode by one and reduces its parcel credit count with respect to the particular station in destination mode by the number of parcels sent upon sending the source packet to the particular station circuit in destination mode.

2. The system of claim 1, wherein the station circuit includes at least one of a data consumption block and a data generation block.

3. The system of claim 2, wherein the data consumption block includes at least one of a data compression engine and an encryption engine and the data generation block includes at least a data access block.

4. The system of claim 1, wherein the source packet and destination packet include at least one of a command, an address, a tag, a length, and a payload.

5. The system of claim 1, wherein the at least one source parcel and at least one destination parcel include at least one of a source field, a destination field, a parcel payload, a thread identification number, and a virtual machine identification number.

6. The system of claim 1, wherein a particular source parcel is part of the disassembled packet and the one or more source parcels can correspond, with the one or more destination parcels, which can be reassembled into the destination packet, which represent the source packet.

7. The system of claim 1, wherein the data layer is synchronized to a first clock and the transport layer is synchronized to a second clock, and the first and second clock are not required to have either the same clock rate or any phase relationship.

8. The system of claim 1, wherein the ring includes a credit interconnect ring and a data interconnect ring, the data interconnect ring delivering the one or more source parcels from the particular station circuit in source mode to the particular station circuit in destination mode as one or more destination parcels, and the credit interconnect ring returns a command credit to the particular station circuit in source mode, the returned command credit generated by the particular station circuit in destination mode upon the particular station circuit in destination mode consuming all of the one or more destination parcels such that the particular station circuit in source mode adds a command credit to the command credit count of the particular station circuit in source mode with respect to the particular station circuit in destination mode.

9. The system of claim 8, wherein the credit interconnect ring further returns a parcel credit to the particular station circuit in source mode, the returned parcel credit generated by the particular station circuit in destination mode upon consuming a particular set of the one or more destination parcels such that the returned parcel credit represents one or more parcels being consumed and the particular station circuit in source mode adds a parcel credit to the parcel credit count of the particular station circuit in source mode with respect to the particular station circuit in destination mode.

10. The system of claim 9, wherein the returned parcel credits are generated for the particular set of the one or more destination parcels when a slot of the credit return ring becomes available.

11. The system of claim 8, wherein the command credit count of the particular station circuit in source mode with respect to the particular station circuit in destination mode is set by a credit-source station circuit issuing command credits over the credit interconnect ring, and the parcel credit count of the particular station circuit in source mode with respect to the particular station circuit in destination mode is set by the credit-source station circuit issuing parcel credits over the credit interconnect ring, the credit-source station circuit being one of the plurality of station circuits.

12. The system of claim 11, wherein the credit-source station circuit issues command credits and parcel credits at startup.

13. The system of claim 5, wherein an active station circuit can receive at least one of a command credit and a parcel credit from an inactive station circuit, the active station and inactive station circuit being one of the plurality of station circuits.

14. The system of claim 5, wherein parcel credits and command credits are sent over the credit interconnect ring using a same format.

15. The system of claim 5, wherein command credits are at least one of a read command credit and a write command credit.

16. The system of claim 5, wherein the station circuit in destination mode includes a receiving buffer reserved for a receiving destination parcels from the plurality of station circuits on the ring.

17. A system comprising:
a station circuit including a data layer and a transport layer, the station circuit capable of a source mode and a destination mode, the data layer of the station circuit in source mode disassembling a source packet into one or more source parcels and sending the one or more source parcels to the transport layer, the station circuit in destination mode receiving one or more destination parcels over a ring at its transport layer, reassembling the one or more destination parcels into a destination packet, and delivering the destination packet from the transport layer to the data layer;
wherein the transport layer of the station circuit in source mode transmits the one or more source parcels over the ring and the transport layer of the station circuit in destination mode receives the one or more destination parcels over the ring;
wherein the source and destination packet are tagged with an identification number of a group, where the group indicates a virtual machine identification number, such that a particular station circuit in destination mode can organize a set of destination packets tagged with different groups identification numbers to execute work within the destination packets upon receiving the destination packets;
wherein the particular station circuit is issued credits based on an amount of processing power allocated to a virtual machine, the virtual machine indicated as a virtual machine assigned to work within the destination packets that the particular station circuit accepts.

18. The system of claim 17, wherein the particular station circuit is configured to accept destination packets with work from a subset of identification numbers of groups.

19. A method comprising:
in a station circuit including a data layer and a transport layer, wherein the station circuit is capable of a source mode and a destination mode:
disassembling a source packet into one or more source parcels in the data layer of the station circuit in source mode;
sending the one or more source parcels to the transport layer of the station circuit in source mode;
transmitting the one or more source parcels over a ring from the transport layer of the station circuit;
receiving one or more destination parcels over the ring at the transport layer of the station circuit in destination mode;

reassembling the one or more destination parcels into a destination packet at the station circuit in destination mode; and delivering the destination packet from the transport layer to the data layer at the station circuit in destination mode;

wherein the station circuit is one of a plurality of station circuits interconnected via the ring and each station circuit includes a command credit count with respect to each of the other station circuits on the ring and a parcel credit count with respect to each of the other station circuits on the ring; and further comprising:

in a particular station circuit in source mode:

sending the source packet to a particular station circuit in destination mode if the command credit count of the particular station circuit in source mode with respect to the particular station circuit in destination mode is non-zero and the parcel credit count of the particular station circuit in source mode with respect to the particular station circuit in destination mode is non-zero;

reducing the command credit count of the particular station circuit in source mode with respect to the particular station circuit in destination mode by one; and reducing the parcel credit count of the particular station circuit in source mode with respect to the particular station in destination mode by the number of parcels sent upon sending the source packet to the particular station circuit in destination mode.

20. The method of claim 19, wherein the station circuit includes at least one of a data consumption block and a data generation block.

21. The method of claim 20, wherein the data consumption block includes at least one of a data compression engine and an encryption engine and the data generation block includes at least a data access block.

22. The method of claim 19, wherein the source packet and destination packet include at least one of a command, an address, a tag, a length, and a payload.

23. The method of claim 19, wherein the at least one source parcel and at least one destination parcel include at least one of a source field, a destination field, a parcel payload, a thread identification number, and a virtual machine identification number.

24. The method of claim 19, wherein a particular source parcel is part of the disassembled packet and the one or more source parcels can correspond with one or more destination parcels, which can be reassembled into the destination packet, which represents the source packet.

25. The method of claim 19, further comprising:
synchronizing the data layer to a first clock; and
synchronizing the transport layer to a second clock;
wherein the first and second clock are not required to have either the same clock rate or any phase relationship.

26. The method of claim 19, wherein the ring includes a credit interconnect ring and a data interconnect ring; and further comprising:

delivering, over the data interconnect ring, the one or more source parcels from the particular station circuit in source mode to the particular station circuit in destination mode as one or more destination parcels; and returning a command credit over the credit interconnect ring to the particular station circuit in source mode, the returned command credit generated by the particular station circuit in destination mode upon the particular station circuit in destination mode consuming all of the one or more destination parcels such that the particular station circuit in source mode adds a command credit to the command credit count of the particular station circuit in source mode with respect to the particular station circuit in destination mode.

27. The method of claim 26, further comprising:
returning, over the credit interconnect ring, a parcel credit to the particular station circuit in source mode, the returned parcel credit generated by the particular station circuit in destination mode upon consuming a particular set of the one or more destination parcels such that the returned parcel credit represents one or more parcels being consumed and the particular station circuit in source mode adds a parcel credit to the parcel credit count of the particular station circuit in source mode with respect to the particular station circuit in destination mode.

28. The method of claim 27, wherein the returned parcel credits are generated for the particular set of the one or more destination parcels when a slot of the credit return ring becomes available.

29. The method of claim 26, further comprising:
setting the command credit count of the particular station circuit in source mode with respect to the particular station circuit in destination mode from a credit-source station circuit that issues command credits over the credit interconnect ring; and setting the parcel credit count of the particular station circuit in source mode with respect to the particular station circuit in destination mode from the credit-source station circuit that issues parcel credits over the credit interconnect ring;

wherein the credit-source station circuit is one of the plurality of station circuits.

30. The method of claim 29, further comprising:
issuing command credits and parcel credits at startup from the credit-source station circuit.

31. The method of claim 26, further comprising:
receiving, at an active station circuit, at least one of a command credit and a parcel credit from an inactive station circuit;
wherein the active station and the inactive station circuit are one of the plurality of station circuits.

32. The method of claim 26, wherein parcel credits and command credits are sent over the credit interconnect ring using a same format.

33. The method of claim 26, wherein command credits are at least one of a read command credit and a write command credit.

34. The method of claim 26, wherein the station circuit in destination mode includes a receiving buffer reserved for a receiving destination parcels from the plurality of station circuits on the ring.

35. A method comprising:
in a station circuit including a data layer and a transport layer, wherein the station circuit is capable of a source mode and a destination mode:
disassembling a source packet into one or more source parcels in the data layer of the station circuit in source mode;
sending the one or more source parcels to the transport layer of the station circuit in source mode;
transmitting the one or more source parcels over a ring from the transport layer of the station circuit;
receiving one or more destination parcels over the ring at the transport layer of the station circuit in destination mode;

reassembling the one or more destination parcels into a destination packet at the station circuit in destination mode;

delivering the destination packet from the transport layer to the data layer at the station circuit in destination mode;

further comprising:

tagging the source and destination packet with an identification number of a group, the group indicating a virtual machine identification number, such that a particular station circuit in destination mode can organize a set of destination packets tagged with different groups identification numbers to execute work within the destination packets upon receiving the destination packets;

issuing credits to the particular station circuit based on an amount of processing power allocated to a virtual machine;

wherein the virtual machine is indicated as a virtual machine assigned to work within the destination packets that the particular station circuit accepts.

36. The method of claim 35, wherein the particular station circuit is configured to accept destination packets with work from a subset of identification numbers of groups.

\* \* \* \* \*

UNITED STATES PATENT AND TRADEMARK OFFICE
CERTIFICATE OF CORRECTION

PATENT NO.         : 8,989,220 B2
APPLICATION NO.    : 13/481122
DATED              : March 24, 2015
INVENTOR(S)        : Paul G. Scrobohaci et al.

It is certified that error appears in the above-identified patent and that said Letters Patent is hereby corrected as shown below:

In the Claims

Column 14, Claim 13, line 6 delete "5" and insert --8--;

Column 14, Claim 14, line 11 delete "5" and insert --8--;

Column 14, Claim 15, line 14 delete "5" and insert --8--;

Column 14, Claim 16, line 17 delete "5" and insert --8--.

Signed and Sealed this
Twenty-first Day of July, 2015

Michelle K. Lee
*Director of the United States Patent and Trademark Office*